United States Patent Office 3,510,093
Patented May 5, 1970

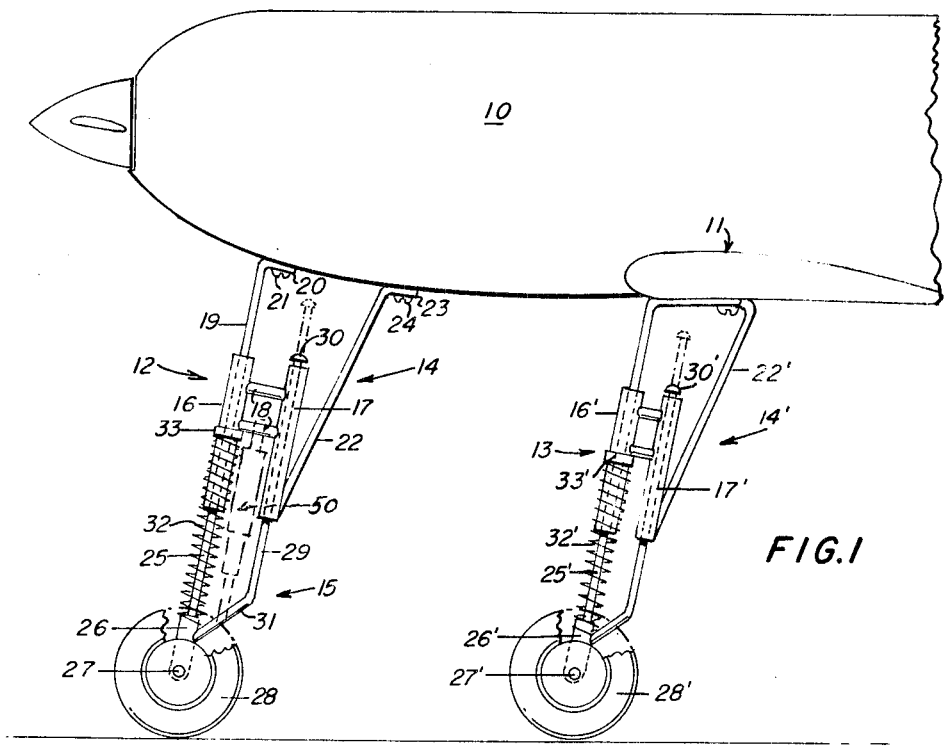
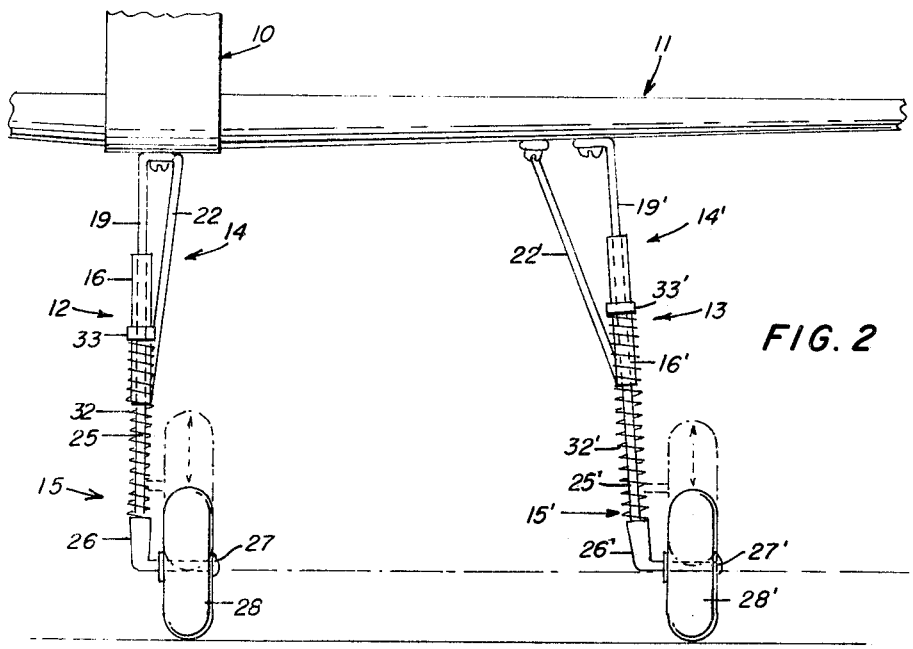

3,510,093
LANDING GEAR FOR AIRPLANES
John Michael Frankovich, 5018 N. Apperson Way,
Kokomo, Ind. 46901
Filed Oct. 19, 1965, Ser. No. 497,662
Int. Cl. B64c 25/62
U.S. Cl. 244—104                          4 Claims

ABSTRACT OF THE DISCLOSURE

The invention pertains to a landing gear for airplanes, in which the landing gear has two fixed upper struts attached to the airplane structure, two interconnected sleeves attached to the fixed struts, two lower movable struts received within the sleeves and joined at their lower ends to support an axle for a ground engaging wheel, a coil spring surrounding one of the movable struts to urge the axle and wheel downward, and stop means on a movable strut to limit the downward movement of the axle and wheel, the fixed struts, sleeves, movable struts and wheel disposed in a common plane.

---

This invention relates to aircraft and more particularly to landing gear for model airplanes and the like.

One object of the invention is to provide novel landing gear means for model aircraft in which the ground engaging wheel is mounted for yieldable movement in a generally vertical direction.

Another object of the invention is to provide means for mounting the ground engaging wheel of a model aircraft in such a way that while it will be yieldable in a vertical direction it will have substantial rigidity in a horizontal plane particularly in the direction of movement of the aircraft.

Still another object of the invention is to provide a landing gear mechanism for model aircraft fabricated principally of flexible metal wire in which the ground engaging wheel is maintained in a substantially rigid position with respect to fore and aft movement it may still be provided with yieldable movement in a vertical straight line direction.

Other objects and advantages will be apparent to those skilled in the art after reading the foregoing specification in connection with the annexed drawings, in which:

FIG. 1 is a side elevation of two forms of landing gear constructed in accordance with this invention and shown attached to the forward portion of a model airplane, and;

FIG. 2 is a front elevation of the devices shown in FIG. 1.

In the drawings there is shown the forward portion of the fuselage and a portion of the left wing section, indicated generally by numerals 10 and 11 respectively, of a model airplane provided with a three-point landing gear system, otherwise known as a tricycle landing gear. In this arrangement a single wheel supporting system, indicated generally by numeral 12 is positioned under the nose portion of the fuselage in the center of the airplane and a pair of wheel supporting structures, indicated generally by numeral 13, are positioned well back of the nose wheel and spaced widely apart usually being attached to the underside of the wings.

In FIG. 2 only a single such structure 13, is shown secured to the underside of the left wing but it will be understood that a similar structure, but of opposite hand, is to be secured to the right hand wing. While the arrangement of the struts differ somewhat depending upon whether the structure supports the wheel at the nose or under a wing, it will be understood that in each case equivalent parts are employed and therefore a description of one of the structures will be sufficient. Further, it will be understood that while a three-wheeled landing gear arrangement is shown in the drawings, the device herein described may be adapted for use in other landing gear configurations.

Basically, the mechanisms comprise an upper frame means indicated generally by numeral 14 and a lower frame means indicated generally by numeral 15. The upper frame means comprises a pair of tubular elements 16 and 17 joined in spaced parallel relationship by a pair of transverse braces 18. A strut 19, which may be fabricated of spring wire stock, has its lower end fitted into the upper end of the tube 16 and is firmly attached thereto such by soldering or crimping or any other suitable method. The upper end of the strut 19 is bent over at right angles as indicated at 20 and may be flattened to provide a bracket 20, and provided with a suitable opening to permit the bracket to be attached to the underside of the fuselage or wing of the plane by means of a screw 21.

Another strut 22, also fabricated of spring wire stock, is attached at its lower end to the bottom of the tube 17 so as to project upwardly and generally rearwardly at a slight angle. The upper end of this strut may also be bent at an angle to form a bracket 23 and disposed generally in the same plane as the bracket 20 and can be provided with a suitable opening for the reception of an attaching screw 24.

The lower frame means 15 includes a strut 25 made of spring wire stock, the upper end of it being slidably received within the lower end of the tube 16 while at its lower end it supports a sleeve 26 having a horizontally extending axle 27 which rotatably supports a landing wheel 28.

A second lower strut 29 extends completely through the tube 17 and is provided with an enlarged portion 30 at or adjacent its upper end to limit downward movement in the tube. The lower portion 31 is bent at an angle and terminates in a connection with the sleeve 26.

A coil spring 32 surrounds the lower strut 25 and the lower portion of the tube 16. The upper end of the spring abutting against a flange 33 surrounding the tubular portion while the lower end of the spring bears against the sleeve 26. The strength of this spring is such that while the aircraft is flying the entire lower frame means 15 will be fully extended to the extent permitted by the abutment of the enlarged portion 30 against the top of the tube 17. In this position the spring will also be under a certain amount of compression sufficient to absorb the weight of the aircraft when landing to permit limited amount of upward movement of the lower frame means upon contact with the ground and preferably sufficient such that under normal landing conditions the lower frame means will never be forced upwardly to the full extent permitted.

While it is not usually necessary, in the case of a model airplane to provide shock absorber means to control the rebound action of the spring 32, it would be possible to connect such a device, indicated generally by the numeral 50, between the fixed cross braces 18 and the vertically movable lower leg 31, as indicated by dotted lines in FIG. 1.

Of course, if this type of landing gear is to be used on a full scale aircraft, a shock absorber 50 would be highly desirable, and the other elements of the mechanism such as the struts would be constructed of heavier materials than spring wire.

It will be noted that by placing the upper strut 22 at an angle and generally behind the forward strut 19 the entire assembly is substantially rigid with respect to a fore and aft vertical plane. On the other hand, in the case of the landing gear placed under the nose of the aircraft the spring wire stock of which the struts is made will permit a certain limited amount of side to side flexibility.

In the case of the landing gear 13 intended to be used under the wings, a substantially rigid support both in a fore and aft and in transverse directions can be secured by connecting the upper struts 22′ with the tube 17′ so as to extend not only rearwardly but also slightly to one side as will be observed in FIGS. 1 and 2.

I claim:

1. Landing gear for airplanes comprising a first vertical fixed strut, the upper end of said strut to be secured to an airplane frame, a coaxial sleeve depending from the lower end of the strut, a second sleeve attached to the first sleeve in parallel spaced relationship, a second fixed strut secured at its lower end to the lower end of the second sleeve, extending upwardly at an angle thereto, the upper end of the second fixed strut to be secured to an airplane frame, said struts and sleeves being disposed in a common plane, a landing wheel including a horizontal supporting axle, a pair of movable strut members secured at their lower ends to the supporting axle and having their upper ends slidably received in said respective fixed sleeves, coil spring means surrounding one of the movable struts for urging downward movement of the axle, and stop means for limiting said downward movement.

2. The landing gear defined in claim 1, in which said stop means for limiting said downward movement includes shock absorber means connected between said movable struts and one of the fixed struts for yieldably resisting said downward movement.

3. The landing gear defined in claim 1, wherein one of said pair of movable strut members extends through the length of one of said sleeves to project above the sleeve and said stop means includes a radially enlarged portion provided on the extremity of said one movable strut member above the sleeve for abutting against the upper end of the sleeve to limit downward movement of the strut.

4. The landing gear defined in claim 1, wherein said first vertical fixed strut comprises a rod, the lower end of the rod being received within the upper portion of the length of said coaxial sleeve, the upper end of the rod being angularly directed to provide means for securing the strut to an airplane.

References Cited

UNITED STATES PATENTS

| 1,852,230 | 4/1932 | Breuget | 244—104 |
| 2,218,370 | 10/1940 | Hojnowski | 244—104 |
| 2,395,548 | 2/1946 | Hojnowski | 244—102 XR |
| 1,864,134 | 6/1932 | Harris | 244—104 |
| 1,904,372 | 4/1933 | Kane | 244—104 X |
| 2,105,374 | 1/1938 | Saulnier | 244—104 X |
| 2,233,191 | 2/1941 | Arcier | 244—104 |
| 2,403,129 | 7/1946 | Shaeffer | 46—76 |

FOREIGN PATENTS

| 634,725 | 11/1927 | France. |
| 5,287 | 2/1915 | Great Britain. |

FERGUS S. MIDDLETON, Primary Examiner

P. E. SAUBERER, Assistant Examiner

U.S. Cl. X.R.

46—76